United States Patent
Gratrix et al.

(10) Patent No.: US 9,294,184 B1
(45) Date of Patent: Mar. 22, 2016

(54) ACCURATE FAST-SWITCHING CROSS POLARIZATION REPEATER USING NON-RECIPROCAL SOLID-STATE PHASE SHIFTERS

(75) Inventors: Henry A. Gratrix, Richfield Springs, NY (US); Ronald P. Gouse, Utica, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 05/321,501

(22) Filed: Jan. 5, 1973

(51) Int. Cl.
*H01Q 19/00* (2006.01)
*H04B 7/15* (2006.01)

(52) U.S. Cl.
CPC ........................ *H04B 7/15* (2013.01)

(58) Field of Classification Search
CPC ........................................................ H04B 7/15
See application file for complete search history.

(56) References Cited

U.S. PATENT DOCUMENTS

| | | | | |
|---|---|---|---|---|
| 1,856,009 A | * | 4/1932 | Washington et al. | 325/12 |
| 3,500,207 A | * | 3/1970 | Ruthroff | 325/60 |

* cited by examiner

*Primary Examiner* — Daniel Pihulic
(74) *Attorney, Agent, or Firm* — Howard IP Law Group

(57) ABSTRACT

In a system for receiving an input signal, for example, at radar frequencies, having polarization components and transmitting an output signal which is cross polarized with respect to an input signal, separate transmit and receive phase shift networks are utilized. Consequently, the phase shift circuitry utilized need not be reciprocal, in order to provide accurate cross polarization.

5 Claims, 1 Drawing Sheet

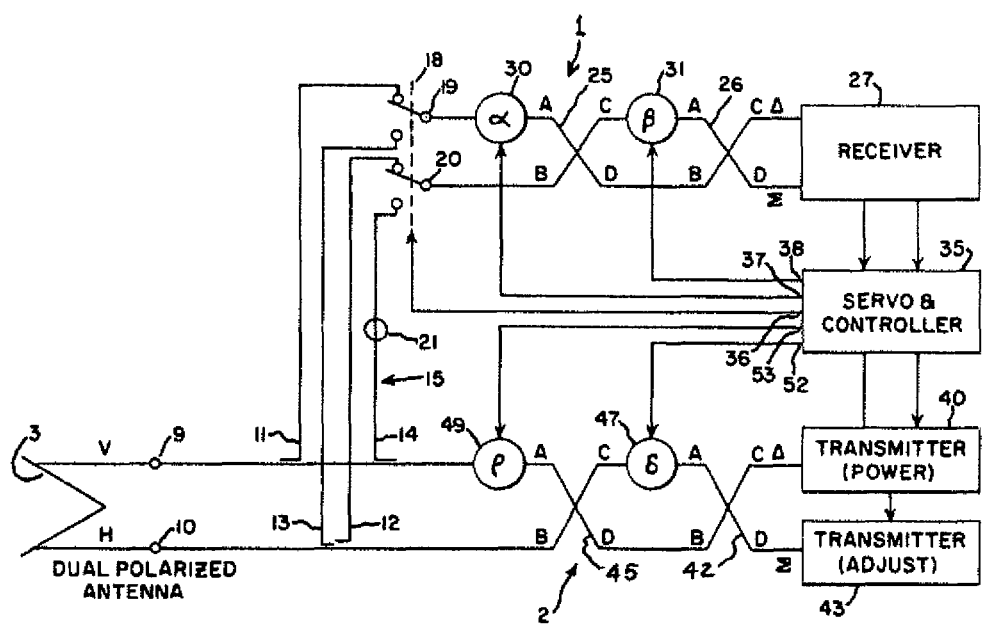

US 9,294,184 B1

ACCURATE FAST-SWITCHING CROSS POLARIZATION REPEATER USING NON-RECIPROCAL SOLID-STATE PHASE SHIFTERS

BACKGROUND OF THE INVENTION

The invention described herein was made in the course of or under a contract or subcontract thereunder with the Department of the Air Force.

This invention relates to reflected and/or otherwise return wave systems, and more particularly, to a system for transmitting an output signal which is cross polarized with respect to an input signal.

In the past, cross polarization has been accomplished by the use of a microwave nulling network using reciprocal electromechanical phase shift elements. This is a two-port network in which an input signal is resolved into two orthogonal components. The two outputs are used to derive error signals which are applied to control mechanical phase shifting devices until one of the output ports is nulled. Use of a two-port network in which an error signal is utilized to control a phase shifter to null an error is well-known in the art. Examples are found in, for example, monopulse radar tracking circuits.

A desirable improvement in such two-port networks would be the inclusion of solid-state phase shifters in place of mechanical phase shifters. Solid-state phase shifters have improved switching speed which improves system operation. However, an obstacle in the use of solid-state phase shifters is inadequate reciprocity. In other words, while coupling a signal in a first direction from antenna to receiver, a phase shift of a first value is provided, but a phase shift of a different value is provided when transmitting a signal in the opposite direction, from a transmitter to the antenna.

SUMMARY OF THE INVENTION

It is, therefore, a broad object of the present invention to provide a two-port network comprising a cross polarization repeater utilizing solid-state phase shifters.

It is a more particular object of the present invention to provide a two-port network of the type described utilizing a first set of phase shifters for signal transmission in a first direction, and a second set of phase shifters for signal transmission in a second direction, whereby precise cross-polarization may be provided without requiring the use of reciprocal phase shifters.

Briefly stated, in accordance with the present invention, there is provided a two-port network incorporating a polarimeter utilizing non-reciprocal phase shifters in which input signals from a dual polarized antenna are coupled to a first network for resolving signals transmitted in a first direction, and a second network coupled to the antenna, also utilizing non-reciprocal phase shifters provides a cross-polarized output signal. A test signal provided from the second network is cross-polarized and coupled to the first network in order to generate an error signal for setting phase shifters in the second network.

BRIEF DESCRIPTION OF THE DRAWINGS

The means by which the foregoing objects and features of novelty are achieved are pointed out in the claims forming the concluding portion of the specification. The invention, both as to its organization and manner of operation, may be further understood by reference to the FIGURE which is a block diagrammatic representation of a two-port radio frequency network for cross-polarization constructed in accordance with the present invention.

DESCRIPTION OF THE PREFERRED EMBODIMENT

Referring to the FIGURE, the two-port network may be broadly described as a first radio frequency network 1 in parallel with a second radio frequency network 2 and both coupled to a dual polarized antenna 3. Feedback loops described below are provided for nulling of phase errors. The dual polarized antenna 3 provides a first output 9 and a second output 10, respectively referred to as V and H outputs and which may correspond to outputs indicative of vertically and horizontically polarized components. The received input signal is coupled to the first radio frequency network 1, from the outputs 9 and 10 by couplers 11 and 12 respectively, which comprise radio frequency coupling means. Couplers 13 and 14 are provided for coupling test inputs (described below) from the network 2 to the network 1. A double pole double throw switch (or ganged radio frequency switches) 18 is provided having first and second terminals 19 and 20 connected to the network 1. A 180 degree phase shifter 21 is connected in series with the coupler 14. When the switch 18 is closed in a first position, the coupler 11 is coupled to the terminal 19 and the coupler 12 is coupled to the terminal 20 to couple the output of the antenna 3 to the network 1. When the switch 18 is closed in a second position, the coupler 13 is coupled to the terminal 19 and the coupler 14 is coupled to the terminal 20. The 180 degree phase shifter 21 in series with the coupler 14, the coupler 13 and switch 18 comprise means 15 for cross-polarizing a test signal (described below) coupled from the network 2 to the network 1. The network 1 includes cascaded 180 degree hybrids 25 and 26 connected between the switch 18 and a receiver 27. The hybrids 25 and 26, as well as the hybrids described below, are conventional 180 degree hybrids well-known in the art having A and B input ports, and C and D output ports. A variable phase shifter 30 is connected between the terminal 19 and the A input of the hybrid 25; the B input of the hybrid is connected to the terminal 20. A variable phase shifter 31 is connected between the C output of the hybrid 25 and the A input of the hybrid 26. Outputs of the receiver 27 are provided to a servo and controller 35 providing a first output 36 to control the position of the switch 18, a second output 37 coupled to the phase shifter 30 for determining the value of phase shift provided thereof, and a third output 38 similarly coupled to the phase shifter 31.

For purposes of description, the A and C ports of each 180 degree hybrid are referred to as the upper ports, and the B and D ports are referred to as the lower ports.

The servo and controller 35 includes conventional circuitry for providing control signals to solid state phase shifters and timing circuitry for controlling the sequence of operation. The servo and controller 35 is coupled to provide control signals to a transmitter-power unit 40 having an output coupled to an upper port, the C port of a hybrid 42 and providing power to a transmitter-adjust unit 43 providing an input to a lower port, the D port of the hybrid 42. The transmitter-power unit 40 may, for example, include a traveling wave tube, and the transmitter adjust unit 43 may be a low power oscillator. The hybrid 42 is coupled to another hybrid 45. A phase shifter 47 is coupled between the upper ports of the hybrids 42 and 45. The lower, B port of the hybrid 45 is connected to the antenna terminal 10, and a variable phase shifter 49 is connected between the upper output port of the hybrid 45 and the antenna terminal 10. Outputs 52 and 53 are respectively connected to the phase shifters 47 and 49 respectively for controlling the value of phase shift provided by each. For maximum speed and frequency response, the phase sifters 30, 31, 47 and 49 are solid state and may include, for example, conventional voltage-controlled ferrite phase-shifting elements. The phase shifter 30 provides a phase shift having a value a, similarly the phase shifter 31 provides a phase shift, the phase shifter 47 provides a phase shift 6, and the phase shifter 49 provides a phase shift p.

Operation of the Circuit

In operation, a signal is received from the antenna 3 in the network 1, the switch 18 is put in the first position by the servo and controller 35. The delta channel of the hybrid 26, the C port, is used to "set" the phase shifters 30 and 31. This setting is a conventional operation in which the voltage-signal outputs 37 and 38 of the servo and controller 35 operate on the solid-state phase shift elements 30 and 31 until the signal at the C output port of the hybrid 26 nulls, i.e., reduces to zero. The radio frequency network 1, in conjunction with the servo and controller 35, may thus be viewed as a polarimeter which measures the polarization of the input signal.

The timing circuitry in the servo and controller 35 next closes the switch 18 in its second position and enables the transmitter-adjust unit 43. A test signal is transmitted into the D port of the hybrid 42. The test signal emanating from the network 2 has approximately the same polarization components as the input signal from antenna 3 since the shifters 47 and 49 retain the setting given them during the preceding cycle of operation (the assumption being that the polarization of the input changes slowly in comparison to the repetition rate of the test cycles).

It is described to match the signal thus coupled to the network 1 to the signal which was coupled from the antenna 3. The phase shifters 30 and 31 retain their setting. The servo and controller 35 operates to adjust the phase shifters 47 and 49 by varying the voltages on lines 52 and 53 until the signal at the D port of hybrid 26 nulls. The D port is used as the reference port in this instance rather than the C port due to the cross-polarization effect of the network 15. When the D port output nulls, the phase sifters 47 and 49 are sent such that $\rho=\alpha$ and $\delta=\beta$. Under these conditions the polarization components of the signal from network 2 exactly match those which had been coupled to network 1 from the antenna 3 just before the reversal of switch 18.

The servo and controller 35 next enables the transmitter power unit 40. The radio frequency network 2 may be considered to be a polarimeter which modifies the polarization between its input, the C and D ports of the hybrid 42 and its output. The output of the polarimeter comprising the radio frequency network 2 appears at the B port of the hybrid 45 and the terminal of the phase shifter 49 remote from the A port of the hybrid 45. By virtue of the above operation, the signal emitted from antenna 3 in response to the output of the radio frequency network 2 is cross-polarized with respect to the input signal. (The servo and controller 35 may be programmed by well-known means to disable the receiver 27 during this operation).

Mathematically, this operation is demonstrated as follows:
First, consider an input signal such that $$V = \sin \gamma \, e^{j\theta} \quad (1)$$

$$H = \cos \gamma \quad (2)$$

Now, if the switch 18 is in the first position, and the shifters are set to provide a delta port, or C port of the hybrid 26, null, then the phase shifter 30 provides a phase shift of $$\alpha = \pi/2 - \theta \quad (3)$$

and the phase shifter 31 provides a phase shift of $$\beta = \pi + 2\gamma \quad (4)$$

It is necessary to set the phase shifters 47 and 49 such that $$\rho = \alpha \quad (5)$$

$$\delta = \beta \quad (6)$$

Then a transmitted signal from the network 2 would be cross-polarized with respect to the input signal as described previously.
Assume that $$\rho = \alpha = \pi/2 - \theta \quad (7)$$

$$\delta = \beta = \pi + 2\gamma \quad (8)$$

The signals at each port of the hybrids 25, 26, 42 and 45 are defined in the well-known manner as follows: $A=(C+D)/\sqrt{2}$, $B=(D-C)/\sqrt{2}$, $C=(A-B)/\sqrt{2}$, $D=(A+B)/\sqrt{2}$.

The signals at the various points of the circuit are as follows (the convention is used of denoting a terminal by a letter corresponding to a port followed by a number denoting the hybrid including that port):

C42=0
D42=A
A42=A/$\sqrt{2}$
B42=A/$\sqrt{2}$
C45=A/$\sqrt{2}e^{j(\pi+2\gamma)}$
D45=A/$\sqrt{2}$
A45=A/$2e^{j(\pi+2\gamma)}$+A/2
B45=A/2-A/$2e^{j(\pi+2\gamma)}$ $$\text{Signal at coupler } 14 = A/2 e^{j(\frac{3\pi}{2}+2\gamma-\phi)} + A/2 e^{j(\frac{\pi}{2}-\phi)}$$

Signal at coupler 13=A/2-A/2 $e^{j(\pi-2\gamma)}$
which reduces to
Signal at coupler 14=A sin $\gamma$ $e^{j(\gamma-\theta)}$
Signal at coupler 13=A cos $\gamma$ $e^{j\gamma}$
With the switch 18 set in the second position,
Signal at 19=A cos $\gamma$ $e^{j\gamma}$
Signal at 20=A sin $\gamma$ $e^{j(\pi+\gamma-\theta)}$ $$A25 = A\cos\gamma \, e^{j(\frac{\pi}{2}+\gamma-\phi)}$$

B25=A sin $\gamma$ $e^{j(\pi+\gamma-\theta)}$
Removing the common factors for convenience only,
A25=cos $\gamma$ $e^{jo}$
B25=sin $\gamma$ $e^{j\pi/2}$ $$C25 = \frac{1}{\sqrt{2}} e^{j(-\gamma)}$$

$$D25 = \frac{1}{\sqrt{2}} e^{j(\gamma)}$$

$$A26 = \frac{1}{\sqrt{2}} e^{j(\pi+Y)}$$

$$B26 = \frac{1}{\sqrt{2}} e^{j(Y)}$$

$C26 = 1\ e^{j(\pi+Y)}$ $D26 = 0$

Note that in this case the sigma or D port of the hybrid 26 has been nulled. Therefore, the outputs 52 and 53 can be used to set the phase shifters 47 and 49 to the correct values.

Many departures may be made from the exact circuitry of the FIGURE. For example, with the proper alteration of the networks 1 and 2 the transmitter-adjust unit 43 and transmitter-power unit 40 may both be coupled to either the C or D port of the hybrid 42, or their connections as described above may be reversed. Also, a single transmit function may be used to produce a test signal and a transmitted signal. The dual function of the preferred embodiment is utilized to minimize the test signal. Circuit modifications may then be made in accordance with the above teachings. For example, modification in the means 15 for the cross-polarization may be required. To cross polarize a signal coupled from the network 2 to the network 1, it is necessary to reverse its polarity and add a 180 degree phase shift in series with a coupler 13 or 14. In order to produce the desired phase shifts, it may be necessary to null a different one of the C and D ports of the hybrid 26 during different portions of the operating cycle described above. Which of the ports is the correct one to null for a given configuration can be determined by using the form of analysis set forth above.

As described above, one test signal is coupled from the network 2 to the network 1 for each input pulse received from the antenna 3. However, the servo and controller 35 may be preset by well-known means to provide a plurality of test signals and adjustments, e.g. three, for each input pulse. The number of iterations performed in setting the values of p and 6 for the phase shifters 47 and 49 respectively for each input pulse is a matter of choice based on servo loop analysis, primarily taking into account gain considerations.

It should also be pointed out that the system depicted is digital. The various signals, i.e. the input pulse and test signal(s) are produced only during small percentage of the interpulse period of the pulse train of which the input pulse discussed above is a part. The phase shifters 30, 31, 47 and 49 are solid state and have fast response times. Consequently, the cross-polarization repeater of the present invention is capable of responding to pulses within a plurality of interlaced pulse trains.

It is noted that a cross-polarization repeater has been built in accordance with the present invention utilizing presently available, non-reciprocal solid state phase shifters providing an accuracy of better than one degree, even in response to a dynamic polarization input pulse train. In a prior circuit utilizing similar phase shifters in a reciprocal mode, errors of at least five degrees would be provided. In typical applications, an output having this error is not useable.

What is thus provided is a cross-polarization repeater providing substantially exact cross-polarization without the requirement for reciprocal phase shifters. Consequently, solid state phase shifters may be utilized which are faster in response and have better frequency response than mechanical phase shifters. Those skilled in the art should be able to construct a circuit in accordance with the present invention differing in specific details from the preferred embodiment in accordance with the above teachings.

What is claimed as new and desired to be secured by Letters Patent of the United States is:

1. An rf cross-polarization repeater comprising, in combination:
   an rf antenna adapted to receive an input signal and to separate said signal into orthogonally related polarization components;
   an rf receiver;
   a first transmission channel connecting said antenna and said receiver, said first channel being adapted to transmit said polarization components of said input signal in separate subchannels;
   first adjustable phase shift means included in said first channel;
   first detection means connected to said receiver for adjusting said first phase shift means to null the signal presented to said receiver by one of said subchannels;
   a second rf transmission channel coupled to said first channel at the antenna end thereof, said second channel having two subchannels connected to the subchannels of said first channel;
   second adjustable phase shift means included in said second channel;
   testing means for presenting a test signal to said receiver by applying a signal to one of the subchannels of said second channel and for simultaneously adjusting said second phase shift means to null the signal thus presented to said receiver by one of the subchannels of said first channel;
   a transmitter connected to the other of the subchannels of said second channel; and
   sequencing means for operating first said first detecting means, then said testing means and then said transmitter in a recurring sequence to transmit from said second channel a pulsed output signal which maintains a substantially cross-polarized state with respect to the polarization state of said input signal.

2. The combination set forth in claim 1, further comprising means for connecting said second channel to said antenna and for isolating said receiver from said antenna during operation of said transmitter, whereby said antenna functions both to receive said input signal and to broadcast said output signal.

3. The combination set forth in claim 1, wherein said first and second adjustable phase shift means comprise non-reciprocal solid state phase shifting elements.

4. The combination set forth in claim 1, wherein said first and second rf transmission channels comprise a pair of cascaded 180 degree four-port hybrids with an adjustable phase shifter connected therebetween in one of said subchannels, said first channel further comprising a second adjustable phase shifter connected in the other of said subchannels at the input end thereof and said second channel further comprising a second adjustable phase shifter connected in the other of said subchannels at the output end thereof.

5. An rf cross-polarization repeater comprising, in combination:
   rf antenna means adapted to receive an input signal and to separate said signal into orthogonally related polarization components;
   a two channel rf conduction network coupled at its output end to said antenna means and including a pair of cascaded 180 degree four-port hybrids, a first adjustable phase shifter connected between said hybrids in one of said channels and a second adjustable phase shifter connected between said output end and the second of said hybrids in the other of said channels;
a high power source of rf radiation connected to one of said channels at the input end of said conduction network;
a low power source of rf radiation connected to the other of said channels at the input end of said conduction network;
means controlled by said receiver for operating said low power rf source and adjusting said phase shifters until the polarization state of the signal emanating from said conduction network substantially matches that of said input signal; and
means controlled by said last-mentioned means for turning on said high power rf source whereby said antenna means emits a signal which is substantially cross-polarized with respect to said input signal.

* * * * *